US011325056B2

(12) United States Patent
Olschok et al.

(10) Patent No.: US 11,325,056 B2
(45) Date of Patent: May 10, 2022

(54) PHASE SEPARATION DEVICE

(71) Applicant: HYDAC PROCESS TECHNOLOGY GMBH, Neunkirchen (DE)

(72) Inventors: Markus Olschok, Neunkirchen (DE); Christian Schindler, Schiffweiler (DE); Manuel Huber, Riegelsberg (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 0 days.

(21) Appl. No.: 17/049,378

(22) PCT Filed: May 13, 2019

(86) PCT No.: PCT/EP2019/062190
§ 371 (c)(1),
(2) Date: Oct. 21, 2020

(87) PCT Pub. No.: WO2019/224033
PCT Pub. Date: Nov. 28, 2019

(65) Prior Publication Data
US 2021/0260498 A1    Aug. 26, 2021

(30) Foreign Application Priority Data

May 19, 2018   (DE) .................. 10 2018 004 096.9

(51) Int. Cl.
*B01D 29/13*        (2006.01)
*B01D 17/04*        (2006.01)
(Continued)

(52) U.S. Cl.
CPC ........... *B01D 17/045* (2013.01); *B01D 17/10* (2013.01); *B01D 29/13* (2013.01); *B01D 29/54* (2013.01);
(Continued)

(58) Field of Classification Search
CPC ...... B01D 17/045; B01D 17/10; B01D 29/13; B01D 29/54; B01D 29/58; B01D 35/303;
(Continued)

(56) References Cited

U.S. PATENT DOCUMENTS 3,016,984 A * 1/1962 Getzin ................. B01D 46/24
                                                  55/492
3,085,690 A    4/1963 May
(Continued)

FOREIGN PATENT DOCUMENTS

CA    2 576 634      8/2008
DE    28 04 969      8/1978
(Continued)

OTHER PUBLICATIONS

International Search Report (ISR) dated Aug. 8, 2019 in International (PCT) Application No. PCT/EP2019/062190.

*Primary Examiner* — Waqaas Ali
(74) *Attorney, Agent, or Firm* — Wenderoth, Lind & Ponack, L.L.P.

(57) ABSTRACT

A phase separation device has a device housing (2) accommodating at least one coalescer element (42). The device housing (2) has an inlet (38) for the supply of an emulsion, which flows through the respective coalescer element (42) for separation into at least two of its constituents, has an outlet (46) for a separated constituent, and has a further outlet (22, 64) for a further separated constituent having a lower density than the one constituent and floating on the separated constituent having a higher density.

18 Claims, 4 Drawing Sheets

(51) Int. Cl.
  *B01D 17/00* (2006.01)
  *B01D 29/54* (2006.01)
  *B01D 29/58* (2006.01)
  *B01D 35/30* (2006.01)
  *B01D 36/00* (2006.01)

(52) U.S. Cl.
  CPC ........... *B01D 29/58* (2013.01); *B01D 35/303* (2013.01); *B01D 36/001* (2013.01); *B01D 36/003* (2013.01); *B01D 2201/0415* (2013.01)

(58) Field of Classification Search
  CPC ................ B01D 36/001; B01D 36/003; B01D 2201/0415; B01D 29/15; B01D 29/23; B01D 29/56
  See application file for complete search history.

(56) References Cited

U.S. PATENT DOCUMENTS

| | | | |
|---|---|---|---|
| 4,058,463 A * | 11/1977 | Bartik | B01D 29/23 210/317 |
| 5,965,015 A | 10/1999 | Ronan et al. | |
| 2004/0010937 A1* | 1/2004 | Naganawa | D06F 43/086 34/595 |
| 2009/0049872 A1* | 2/2009 | Noro | D06F 43/085 68/18 C |
| 2011/0259796 A1 | 10/2011 | Chen et al. | |

FOREIGN PATENT DOCUMENTS

| | | |
|---|---|---|
| DE | 42 00 379 | 7/1992 |
| DE | 102 44 743 | 4/2004 |
| DE | 10 2011 110 755 | 2/2013 |
| DE | 10 2011 119 868 | 6/2013 |
| DE | 10 2016 006 509 | 11/2017 |

* cited by examiner

PHASE SEPARATION DEVICE

FIELD OF THE INVENTION

The invention relates to a phase separation device, having a device housing accommodating at least one coalescer element. The device housing has an inlet for the supply of an emulsion, which flows through the respective coalescer element for separation into at least two of its constituents, and an outlet for a separated constituent.

BACKGROUND OF THE INVENTION

From DE 10 2016 006 509 A1 a filter device for fluids is known, having a housing accommodating at least one filter element. The housing has an inlet for the supply of fluid to be cleaned into an unfiltered matter chamber of the housing. The unfiltered matter chamber is separated from a filtrate chamber of the housing by the filter medium of the respective filter element. The filtrate chamber has a filtrate outlet. In this way, the filter element filters the particulate contamination out of the fluid flow in terms of a kind of phase separation. Further, the known filter device has a device generating a magnetic field inside the unfiltered matter chamber, which device generates a magnetic field and has an adhesive surface for ferromagnetic particles attached thereto due to the effects of magnetic force. The particles in such a way as a further phase in the course of the phase separation are separated from the fluid stream.

Furthermore, using coalescence to demix multiphase fluids, such as dispersions and emulsions, is state of the art. A widespread technical application is the separation of the aqueous phase as an admixture in oils or fuels by colloidal particle coalescence, such as the formation of water droplets as the aqueous phase to be discharged. The known phase separators on the market have reached their limits in terms of efficiency, particularly in the separation of foreign oil for a finely dispersed oil phase, for instance in the separation of oils such as machining oils, hydraulic oils, cutting oils and the like.

SUMMARY OF THE INVENTION

The invention addresses the problem of providing a phase separation device having at least one coalescence stage. The device is characterized by a particularly high efficiency in the demixing of emulsions, even emulsions having a finely dispersed oil phase.

According to the invention, this problem is basically solved by a phase separation device having, in addition to the outlet for one separated constituent, a further outlet for a further separated constituent having a lower density than the one constituent and floating on the separated constituent having the higher density. Thus, a combination of coalescence separator and gravity separator is formed in the same device housing. In addition to the high efficiency of the separation rate, the separated phases are each available in a separate outlet assigned, so that the constituents can be discharged completely demixed, for instance in the form of a lighter floating oil phase at an upper outlet and an aqueous phase at a subjacent outlet. Furthermore, the combination of coalescence separator and gravity separator in one device housing permits a particularly compact device structure having smaller bath volumes compared to pure gravity separators, which results in smaller exchange volumes when replacing the bath. Minor heat losses owing to a comparatively small housing surface also permit a high energy efficiency.

Advantageously, the arrangement is such that the inlet for the emulsion opens out into the interior of the respective coalescer element, that is flowed through from the inside to the outside.

In advantageous embodiments, the device housing is formed from, viewed in the vertical installation direction, an elongated, in particular multi-part housing sleeve. The sleeve has the inlet for the emulsion and the one outlet for the one separated constituent on the foot-side, preferably in the lower third of the housing, and has the further outlet for the further separated constituent on the head-side, preferably in the upper third of the housing, particularly preferably at the uppermost position of the device housing.

Advantageously the arrangement may be such that the outlet for the one separated constituent is placed below the entry into the coalescer element, immediately downstream of this inlet, in the device housing.

In the case of particularly advantageous embodiments, regarding the receiving volume of the device housing more volume, preferably more than 1.5 times the volume, is available for the further constituent in comparison to the one constituent. In this way a relatively large dead zone above the coalescer element is formed for the low-density constituent, such as oil, particularly fostering the gravity settling of the lighter phase, such as oil.

Advantageously, the outlet for the further separated constituent, such as oil, can be provided with a valve device and/or a venting device. Degassing by the venting device results in calming the lighter phase, such as the oil phase. The presence of the valve device permits the automatic discharge of the lighter phase, for instance by time control.

Advantageously, at least a part of the coalescer elements used can be provided with a filtration stage as a component of the element. In this way in addition to coalescence separation, maintenance filtration can be performed in the same element.

In particularly advantageous embodiments, at least a part of the coalescer elements used is provided in the outflow direction on the outer circumference with at least one additional supporting sleeve. The additional supporting sleeve preferably fosters drop growth of the one separated constituent by adsorption. This supporting sleeve can advantageously be made of stainless steel and possibly be graduated in several layers. In this respect, the arrangement may advantageously be such that the respective filtration stage and/or the respective coalescer element is accommodated in a fluid-permeable supporting sleeve. This supporting sleeve has at least two sleeve parts, which are foldable by an assigned hinge and which permit in an unfolded position the respective used up element to be replaced by a new element.

In the case of fluids to be demixed that are loaded with contaminants, the emulsion passes through particle filtration, preferably before its phase separation.

In advantageous embodiments, for particle filtration at least one filter element is used, which is accommodated in a further device housing. The structure of the further device housing matches mostly that of the one device housing. The complete device, which is partly formed by identical parts, can then be produced particularly efficiently.

For the particle filtration the respective filter element can be flowed through from the outside to the inside. The filtrate outlet of the further device housing is connected to the inlet of the one device housing positioned adjacent thereto via a connection point. The connection point can be formed by flange tubes.

Particularly advantageously, the invention is suitable for demixing an emulsion in the form of a water-oil mixture. The one constituent to be separated is water and the further constituent to be separated is a hydraulic medium, such as oil.

The subject matter of the invention is also the use of a phase separation device in accordance with the invention for the separation of multi-phase media.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
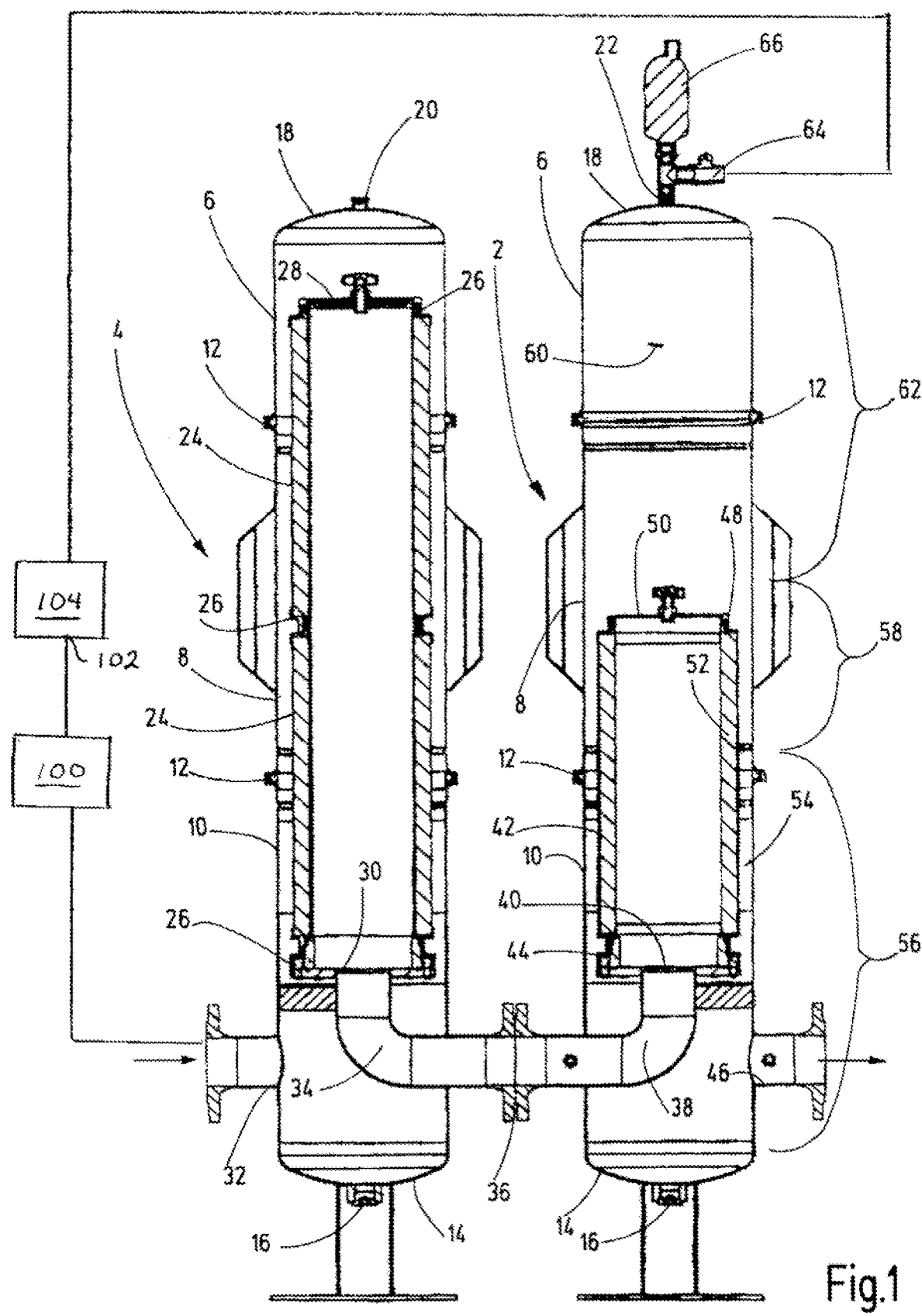
FIG. 1 is a schematically simplified, side view in section of the phase separation device according to a first exemplary embodiment of the invention.

With reference to the attached drawings, the invention is described based on embodiments, in which a combination of a coalescence separator and a gravity separator is located in a first device housing 2. In a second device housing 4, a particle filter is located and is installed as a pre-filter upstream of the coalescence separator and gravity separator in the first device housing 2. While pre-filtration is generally required before demixing in the first device housing 2, the particulate filter in the second device housing 4 may be omitted for media that are free from contaminant loads. Both device housings 2 and 4 have an essentially identical, modular housing structure in the form of a closed pressure vessel. The pressure vessel has in both housings 2 and 4 each an upper housing part 6, a middle housing part 8 and a lower housing part 10, which are circular cylindrical, which have the same diameter and which are connected with each other via flanges 12. Each lower housing part 10 has a curved bottom 14, which is closed except for a drain screw 16. The upper housing parts 6, which, like the lower housing parts 10, are produced by deep-drawing using a shallow-cup process, have, corresponding to the curved bottom 14 of the lower parts 10, a curved upper end 18. The upper end 18 is closed in the second device housing 4 by a centrally located venting screw 20, while at the upper end 18 of the first device housing 2, there is a centrally located outlet port 22.

In the second device housing 4, two filter elements 24 are provided for pre-filtration. The filter elements 24 are arranged coaxially one above the other and are connected with each other at one of their end caps 26 each in such a way that their inner filter cavities merge into each other without a shoulder. The upper end cap 26 of the upper filter element 24 is closed by a sealing cap 28, while the lower end cap 26 of the lower filter element 24 has a centrally located opening 30.

For pre-filtration, the emulsion flows into the second device housing 4 via an inlet 32, which is located below the lower end cap 26 of the lower filter element 24, on the side wall of the lower housing part 10 of the second device housing 4. From the inner room or chamber of the lower housing part 10, the emulsion gets to the intermediate space, encompassing the outside of the filter elements 24, in the second device housing 4 and flows through the filter medium of the filter elements 24 from the outside to the inside to the clean-sided inner room or chamber of the filter elements 24.

A pipe elbow 34 is connected to the central opening 30 of the lower end cap 26 of the lower filter element 24. Via the pipe elbow 34, the prefiltered filtrate leaves the lower housing part 10. The pipe elbow 34 is connected to a pipe elbow 38 via a connecting flange 36. The pipe elbow 38 is inserted into the inner room or chamber of the lower housing part 10 of the first device housing 2.

The end of the pipe elbow 38 forms the entry 40 for the supply of the emulsion into the inside of a coalescer element 42, located in the first device housing 2. As shown, this entry 40 is located at a central opening of the lower end cap 44 of the coalescer element 42. As also shown in the drawing, the lower end cap 44, having the entry 40, is situated at an axial distance above the bottom 14 of the lower housing part 10 and at an axial distance above a lateral outlet 46 of the lower housing part 10 of the first device housing 2. A sealing cap 50 is used to close the upper end cap 48 of the coalescer element 42, as it is the case for the upper filter element 24 in the second device housing 4.

During operation, the emulsion to be demixed flows via the entry 40 of the lower end cap 44 into the inner room or cavity of the coalescer element 42 and flows through its element material 52 from the inside to the outside to the space 54, encompassing the outside of the coalescer element 42, in the first device housing 2. The coalescence stage in the element material 52 causes phase separation by the deposition of an aqueous phase by the growth of droplets of aqueous colloids, which accumulate as aqueous phase 56 in the lower area of the device housing 2, and causes a superjacent oil phase 58.

Figure 2:
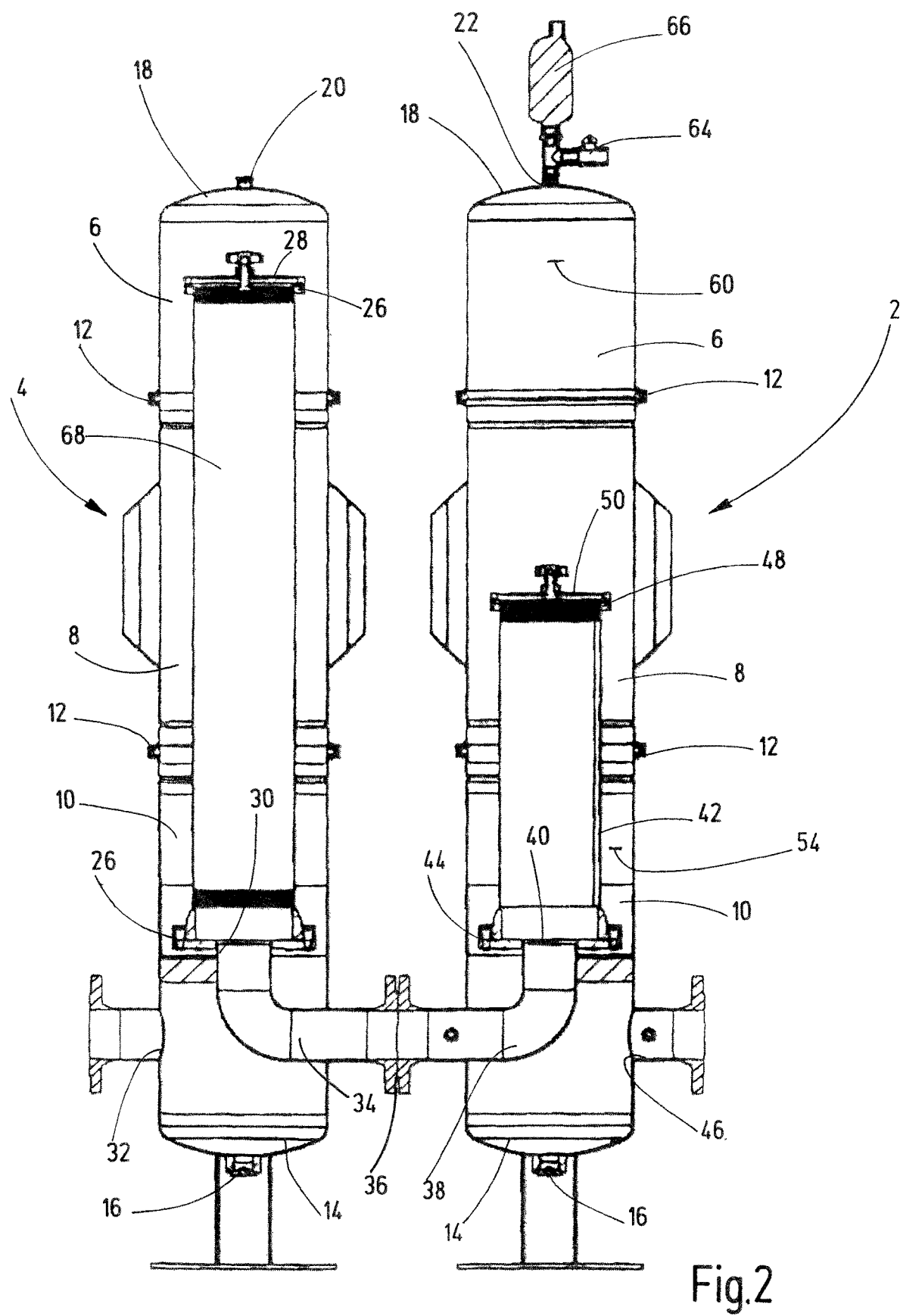
FIG. 2 is a schematically simplified, side view in section of a phase separation device according to a second exemplary embodiment of the invention, wherein the element materials of a coalescer element and of particle filters have been omitted.
Figure 3:
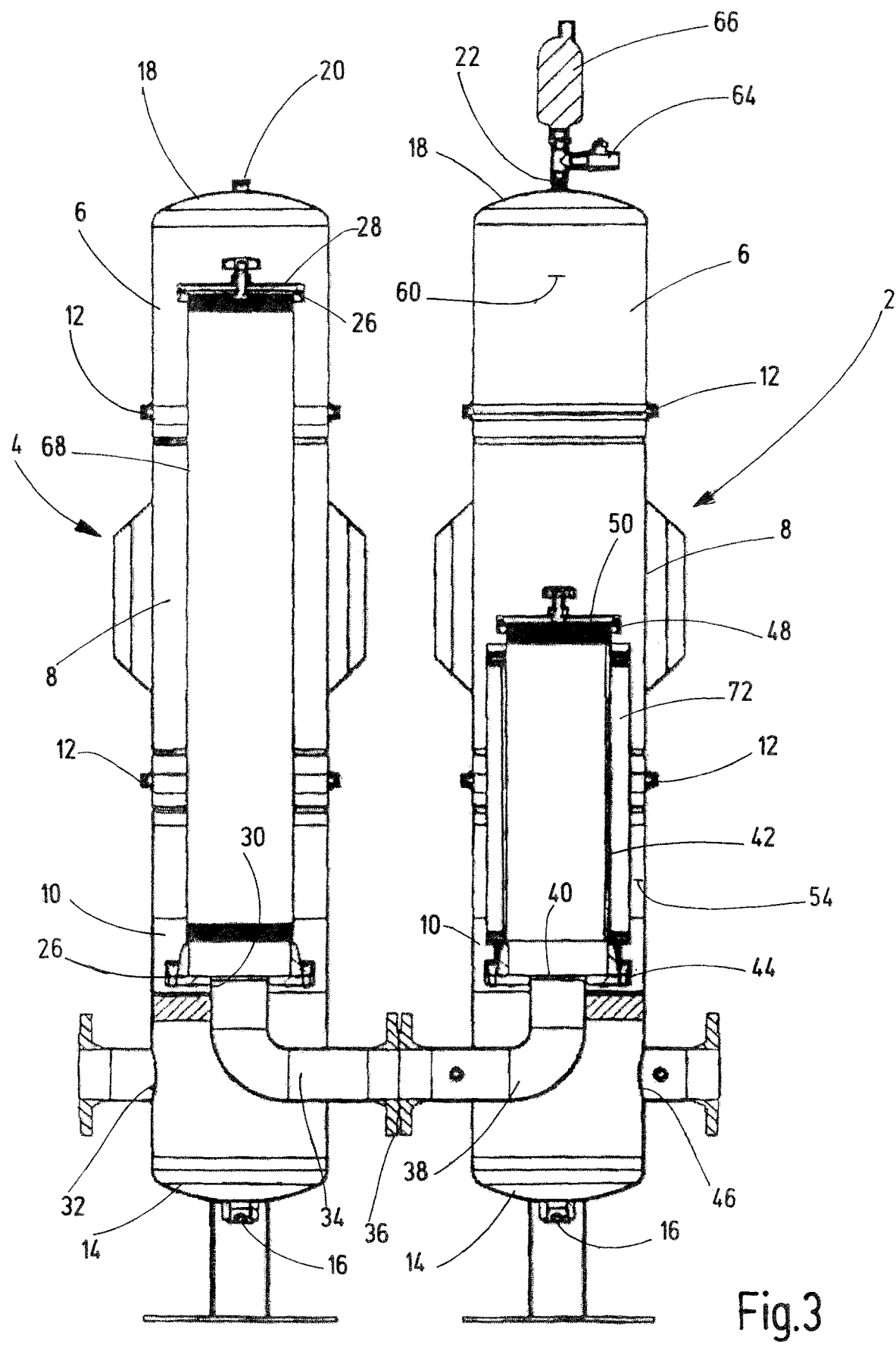
FIG. 3 is a schematically simplified, side view in section of a phase separation device according to a third exemplary embodiment of the invention having a supporting sleeve located on the outside of the coalescer element.

As can be seen from FIGS. 1 to 3, in the first device housing 2 above the coalescer element 42 a dead space 60 is located. Dead space 60, in an upward direction, adjoins to the oil phase 58 as an oil settling zone 62 and extends to the outlet port 22 at the upper housing end 8. This axially extending dead space 60 provides a volume for the lighter oil phase floating on the aqueous phase. The volume is up to 1.5 times larger than the volume of the aqueous phase, and fosters a highly efficient gravity separation of the lighter phase, such as oil.

The port 22, provided at the upper end of the upper housing part 6, forms the outlet for the separated lighter phase. The outlet is controlled by an outlet valve 64. An automatic deaerator 66 is connected to the port 22, ensures the degassing of the settling zone 62, and fosters the efficiency of gravity separation by calming the oil phase. In addition to the coalescence stage, the element material 52 of the coalescer element 42 can be equipped with a filtration stage, which can be designed for maintenance filtration.

The first and second housings have equal heights and widths have a same outer configuration.

The fluid inlet 32 is in downstream fluid communication only with an unfiltrate side of the particle filter 24 inside the first housing 4. The central opening or filtrate outlet 30 is in downstream fluid communication only with the emulsion inlet or entry 40. The emulsion inlet is in downstream fluid communication only with the coalescer element 42. The coalescer element 42 is in downstream fluid communication only with the first and second outlets 46, 64. The fluid flows in series from the fluid inlet through the particle filter to the filtrate outlet, from the filtrate outlet to the emulsion inlet and through the coalescer element and from the coalescer element to the first and second outlets.

A phase separation device includes a feed pump 100 connected in fluid communication to a tank outlet 102 of a storage tank 104 and to a filtrate inlet 32 of the second housing 4. The second outlet 22 is connected in fluid communication to the storage tank 104.

FIG. 2 shows a modified or second embodiment, which differs from the example in FIG. 1 solely in that only a one-piece filter element 68 is used in the second device housing 4, instead of the filter candle for particle filtration formed by two filter elements 24.

Figure 5:
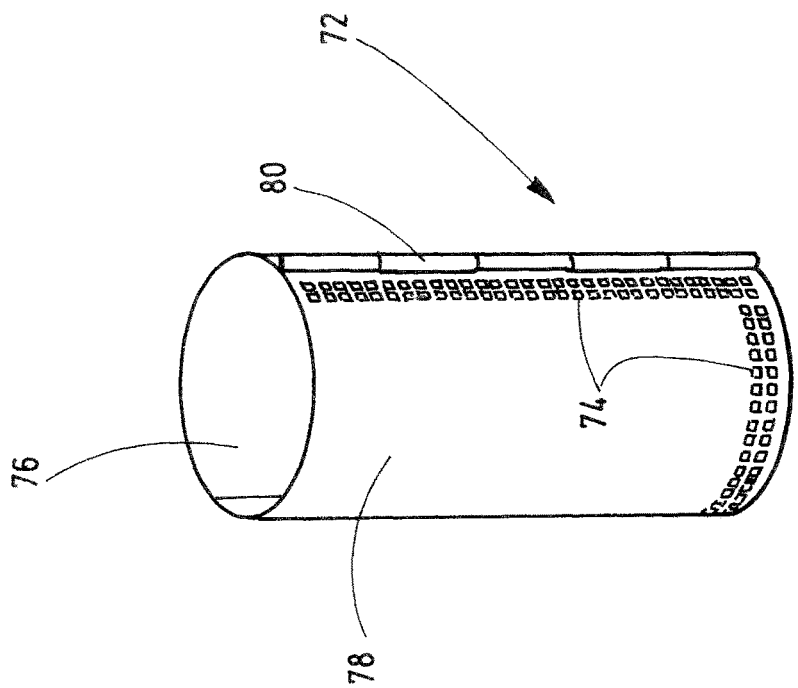
FIG. 5 is a perspective view of the separately shown supporting sleeve for the coalescer element according to an exemplary embodiment of the invention.
Figure 4:
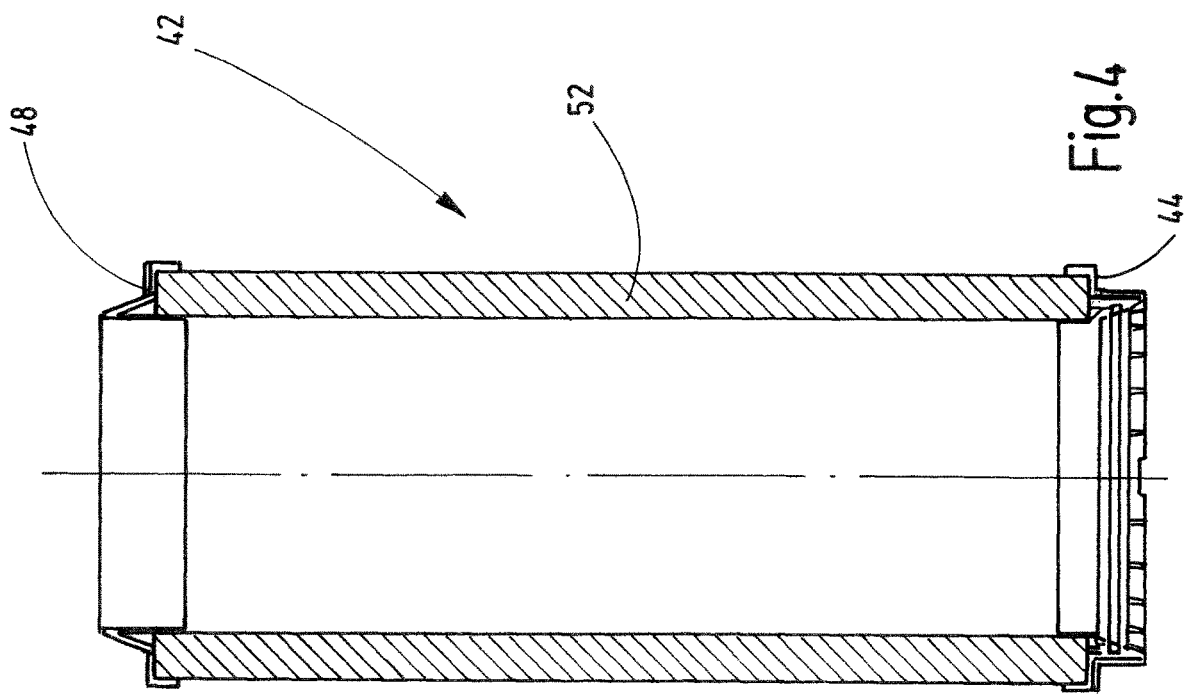
FIG. 4 is a side view in section of a separately shown coalescer element according to an exemplary embodiment of the invention.

The embodiment of FIG. 3 corresponds to that of FIG. 2, except that the outside of the element material 52 of the coalescer element 42 is encompassed by a supporting sleeve 72. Supporting sleeve 72 is shown separately in FIG. 5 and can be laid around the coalescer element 42, which is shown separately in FIG. 4, as a reusable component. The supporting sleeve 72 is made of stainless steel and has a pattern of perforations 74 (only partially shown in FIG. 5). Due to the high interfacial energy of stainless steel, the sleeve 72 additionally fosters the drop growth in the oil by adsorption at the metal surface. In particular for a multilayer, graduated structure of the coalescence stage with increasing porosity in the direction of flow, a high efficiency of separation can be achieved. As FIG. 5 shows, the sleeve 72 is formed from foldable sleeve parts 76, 78, which can be connected with each other by a kind of hinge 80, so that the sleeve 72 can be re-used several times.

While various embodiments have been chosen to illustrate the invention, it will be understood by those skilled in the art that various changes and modifications can be made therein without departing from the scope of the invention as defined in the claims.

The invention claimed is:

1. A phase separation device, comprising:
   a first housing with a coalescer element in the first housing, the first housing having an emulsion inlet supplying an emulsion flowing through the coalescer element separating the emulsion into at least first and second constituents, having a first outlet for the first constituent and having a second outlet for the second constituent having a lower density than and floating on the first constituent in the first housing, thereby providing a coalescence separator and a gravity separator in the first housing;
   a second housing with a particle filter in the second housing, the second housing having a filtrate outlet connected upstream and in fluid communication with the emulsion inlet of the first housing, the first and second housings having equal heights and widths;
   the second housing having a fluid inlet in downstream fluid communication only with an unfiltrate side of the particle filter inside the first housing;
   the filtrate outlet being in downstream fluid communication only with the emulsion inlet;
   the emulsion inlet being in downstream fluid communication only with the coalescer element; and
   the coalescer element being in downstream fluid communication only with the first and second outlets;
   whereby the fluid flows in series from the fluid inlet through the particle filter to the filtrate outlet, from the filtrate outlet to the emulsion inlet and through the coalescer element and from the coalescer element to the first and second outlets.

2. A phase separation device according to claim 1 wherein the emulsion inlet opens in fluid communication directly into an interior chamber of the coalescer element for flow of the emulsion from an inside to an outside of the coalescer element.

3. A phase separation device according to claim 1 wherein the first housing is elongated in a vertical installation direction having the emulsion inlet and the first outlet on a foot side of the first housing and having the second outlet on a head side of the first housing.

4. A phase separation device according to claim 3 wherein the emulsion inlet and the first outlet are in a lower third of the first housing; and
the second outlet is in an upper third of the first housing.

5. A phase separation device according to claim 4 wherein the second outlet is in an uppermost position on the first housing.

6. A phase separation device according to claim 3 wherein the first housing comprise a multipart housing sleeve.

7. A phase separation device according to claim 1 wherein the first outlet is located below an entry into the coalescer element immediately downstream of the emulsion inlet in a vertical direction of the first housing.

8. A phase separation device according to claim 1 wherein the first housing has a receiving volume therein for the second constituent greater than a receiving volume for the first constituent.

9. A phase separation device according to claim 8 wherein the receiving volume for the second constituent is at least 1.5 times greater than the receiving volume for the first constituent.

10. A phase separation device according to claim 1 wherein
the second outlet is at least one of part of a valve or provided with a venting device.

11. A phase separation device according to claim 1 wherein
the coalescer element comprises a filtration stage as a component thereof.

12. A phase separation device according to claim 1 wherein
a supporting sleeve is on an outer circumference of the coalescer element and fosters drop growth of the second constituent by adsorption.

13. A phase separation device according to claim 12 wherein
said supporting sleeve is fluid permeable and comprises two sleeve parts pivotally connected by a hinge permitting the two sleeve parts to be moved to an unfolded position allowing replacement of the coalescer element.

14. A phase separation device according to claim 1 wherein the second housing has a fluid inlet in direct fluid communication with an unfiltrate chamber outside of the particle filter with the filtrate outlet being in direct fluid communication with an interior of the particle filter such that fluid flows from the outside to the inside of the particle filter.

15. A phase separation device according to claim 1 wherein
the emulsion is a water-oil mixture with the first constituent being water and the second constituent being oil.

16. A phase separation device according to claim 1 wherein
a feed pump is connected in fluid communication to a tank outlet of a storage tank and to a filtrate inlet of the second housing; and
the second outlet is connected in fluid communication to the storage tank.

17. A phase separation device according to claim 1 wherein
the first and second housings a same outer configuration.

18. A phase separation device, comprising:
a first housing with a coalescer element in the first housing, the first housing having an emulsion inlet supplying an emulsion flowing through the coalescer element separating the emulsion into at least first and second constituents, having a first outlet for the first constituent and having a second outlet for the second constituent having a lower density than and floating on the first constituent in the first housing, thereby providing a coalescence separator and a gravity separator in the first housing;
a second housing with a particle filter in the second housing, the second housing having a filtrate outlet connected upstream and in fluid communication with the emulsion inlet of the first housing;
the second housing having a fluid inlet in downstream fluid communication only with an unfiltrate side of the particle filter inside the first housing;
the filtrate outlet being in downstream fluid communication only with the emulsion inlet;
the emulsion inlet being in downstream fluid communication only with the coalescer element; and
the coalescer element being in downstream fluid communication only with the first and second outlets;
whereby the fluid flows in series from the fluid inlet through the particle filter to the filtrate outlet, from the filtrate outlet to the emulsion inlet and through the coalescer element and from the coalescer element to the first and second outlets.

* * * * *